US010486700B2

United States Patent
Wrobel et al.

(10) Patent No.: US 10,486,700 B2
(45) Date of Patent: Nov. 26, 2019

(54) SELECTIVE DISABLING OF DECELERATION AREA LEARNING

(71) Applicant: Toyota Motor Engineering & Manufacturing North America, Inc., Erlanger, KY (US)

(72) Inventors: Shannon Alicia Wrobel, Ann Arbor, MI (US); Joshua D. Payne, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 177 days.

(21) Appl. No.: 15/464,527

(22) Filed: Mar. 21, 2017

(65) Prior Publication Data

US 2018/0273036 A1 Sep. 27, 2018

(51) Int. Cl.
*B60W 30/18* (2012.01)
*B60W 50/00* (2006.01)

(52) U.S. Cl.
CPC .... *B60W 30/18072* (2013.01); *B60W 30/181* (2013.01); *B60W 50/0098* (2013.01); *B60W 2050/0014* (2013.01); *B60W 2050/0078* (2013.01); *B60W 2050/0088* (2013.01); *B60W 2050/0089* (2013.01); *Y02T 10/76* (2013.01)

(58) Field of Classification Search
CPC ......... B60W 30/18072; B60W 30/181; B60W 2050/0014
See application file for complete search history.

(56) References Cited

U.S. PATENT DOCUMENTS

| 8,862,342 | B2 | 10/2014 | Oguri et al. | |
| 9,202,378 | B2 | 12/2015 | Otake | |
| 9,262,918 | B2 | 2/2016 | Otake | |
| 2011/0153127 | A1* | 6/2011 | Weslati | B60W 50/085 701/22 |
| 2017/0052028 | A1* | 2/2017 | Choudhury | G01C 21/30 |
| 2018/0252178 | A1* | 9/2018 | Payne | F02D 41/2438 |

* cited by examiner

*Primary Examiner* — Ramsey Refai
(74) *Attorney, Agent, or Firm* — Christopher G. Darrow; Darrow Mustafa PC

(57) ABSTRACT

A vehicle can be configured to learn deceleration areas by acquiring vehicle deceleration data for deceleration areas encountered by the vehicle. However, there may be certain instances in which it may not be beneficial to acquire deceleration data for use in learning the deceleration area. For instance, if it is determined both that the proceeding link for the first deceleration area matches the preceding link for the second deceleration area and that the first deceleration area and the second deceleration area are located in close proximity to each other, the learning of the second deceleration area can be disabled. As a result, a deceleration record is not saved for that particular encounter of the second deceleration area.

16 Claims, 3 Drawing Sheets

| Deceleration Area | Preceding Link(s) | | Proceeding Link(s) |
|---|---|---|---|
| A | 250 | 251 | 252 |
| B | 251 | 252 | 253 |
| C | 253 | 254 | 255 |

SELECTIVE DISABLING OF DECELERATION AREA LEARNING

FIELD

The subject matter described herein relates in general to vehicles and, more particularly, to vehicle learning of repeatedly-encountered deceleration areas.

BACKGROUND

Some vehicles are configured to educate drivers on how to more efficiently operate the vehicle. For example, some vehicles coach a driver when approaching a repeatedly-occurring deceleration area. In such case, the vehicle advises the driver when to remove his or her foot from the accelerator pedal to allow the vehicle to coast and when to brake. Following such advice can result in improved fuel economy.

SUMMARY

In one respect, the subject matter presented herein is directed to a method for a vehicle. The vehicle can be configured to learn deceleration areas. The method can include identifying a proceeding link for a first deceleration area and a preceding link for a second deceleration area. The first deceleration area and the second deceleration area are consecutive deceleration areas. The method can include determining whether the proceeding link for the first deceleration area matches the preceding link for the second deceleration area. The method can further include determining whether the first deceleration area and the second deceleration area are located in close proximity to each other. The method can include, responsive to determining both that the proceeding link for the first deceleration area matches the preceding link for the second deceleration area and that the first deceleration area and the second deceleration area are located in close proximity to each other, disabling the learning of the second deceleration area. As a result, a deceleration record for the second deceleration area is not saved.

In another respect, the subject matter presented herein is directed to a system for a vehicle. The vehicle can be configured to learn deceleration areas. The system can include one or more processors. The one or more processors can be programmed to initiate executable operations. The executable operations can include identifying a proceeding link for a first deceleration area and a preceding link for a second deceleration area. The first deceleration area and the second deceleration area are consecutive deceleration areas. The executable operations can include determining whether the proceeding link for the first deceleration area matches the preceding link for the second deceleration area. The executable operations can include determining whether the first deceleration area and the second deceleration area are located in close proximity to each other. The executable operations can include, responsive to determining both that the proceeding link for the first deceleration area matches the preceding link for the second deceleration area and that the first deceleration area and the second deceleration area are located in close proximity to each other, disabling the learning of the second deceleration area. As a result, a deceleration record for the second deceleration area is not saved.

In still another respect, the subject matter presented herein is directed to a computer program product for a vehicle. The vehicle can be configured to learn deceleration areas. The computer program product comprising a computer readable storage medium having program code embodied therein. The program code is executable by a processor to perform a method. The method can include identifying a proceeding link for a first deceleration area and a preceding link for a second deceleration area. The first deceleration area and the second deceleration area are consecutive deceleration areas. The method can include determining whether the proceeding link for the first deceleration area matches the preceding link for the second deceleration area. The method can further include determining whether the first deceleration area and the second deceleration area are located in close proximity to each other. The method can include, responsive to determining both that the proceeding link for the first deceleration area matches the preceding link for the second deceleration area and that the first deceleration area and the second deceleration area are located in close proximity to each other, disabling the learning of the second deceleration area. As a result, a deceleration record for the second deceleration area is not saved.

DETAILED DESCRIPTION

Figure 1:
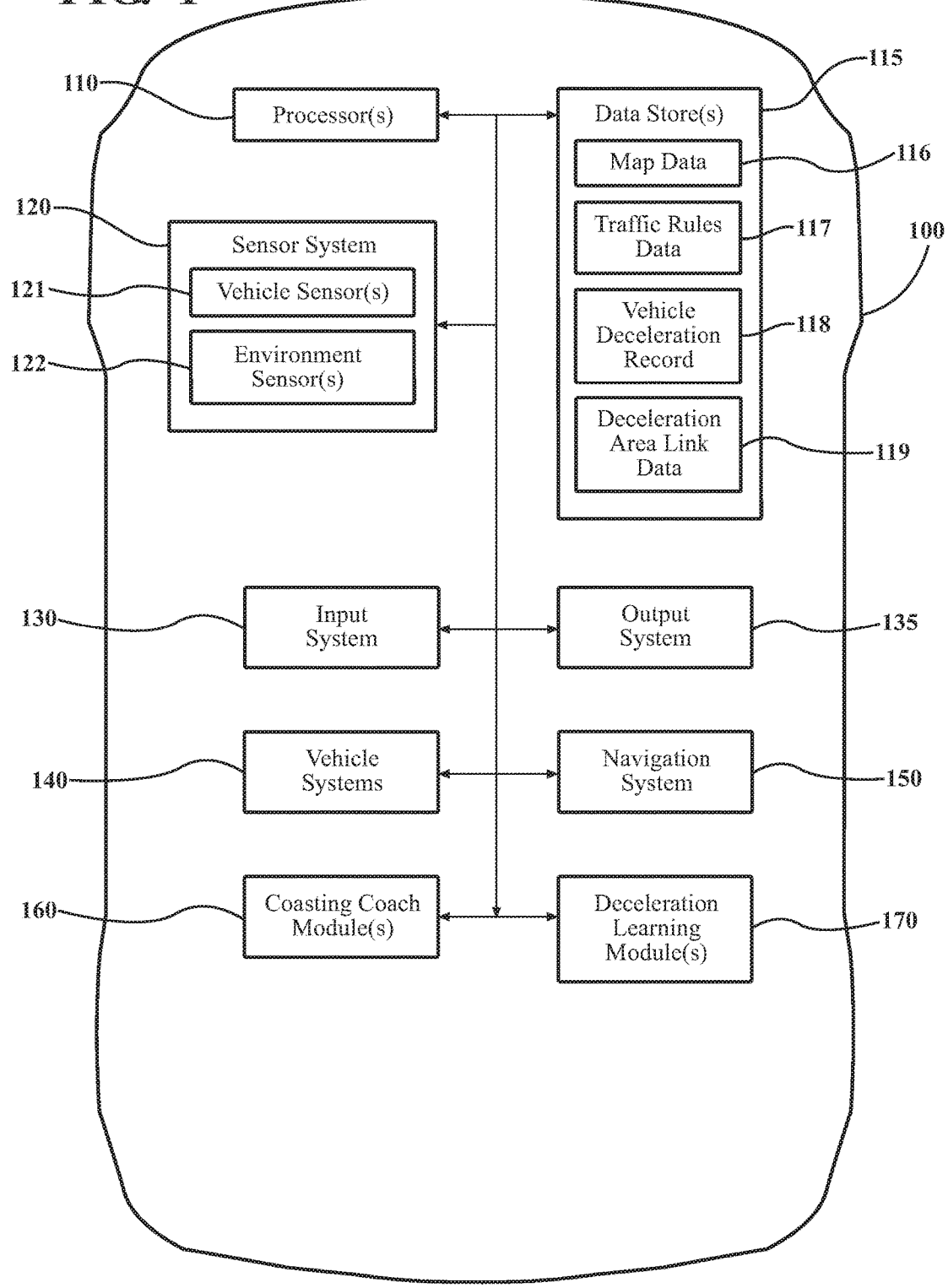
FIG. 1 is an example of a vehicle.

A vehicle can be configured to learn repeatedly-encountered deceleration areas/stops by acquiring vehicle deceleration data when the deceleration area/stop is encountered. Once a deceleration area/stop becomes learned, the vehicle can provide coasting coach support to a driver when approaching the learned deceleration area/stop, advising on how to more efficiently operate the vehicle as it approaches the learned deceleration area/learned stop. However, while the vehicle is still learning a particular deceleration area/stop, there may be certain instances in which it may not be beneficial to acquire deceleration data for use in learning the deceleration area/stop. In such instances, learning of the deceleration area/stop can be disabled. As a result, a deceleration record is not saved for that particular encounter of the deceleration area/stop.

As used herein, "deceleration area" means any area in which a vehicle decelerates or comes to a stop. A deceleration area can occur based on traffic regulating devices (e.g., stop lights, stop signs, yield signs, road markings signs, traffic lights, traffic signs, school zones, etc.), laws, rules, regulations, ordinances, etc. Alternatively or in addition, a deceleration area can be based on prevailing conditions (e.g., traffic congestion, construction, etc.). Thus, a deceleration area can be known in advance, or it can occur in real-time. A "learned deceleration area" is an area in which a vehicle has exhibited a similar deceleration pattern in substantially the same area. More particularly, a "learned deceleration area" can be an area in which a vehicle has exhibited a similar deceleration pattern in substantially the same area for at least a threshold number of times, a minimum number of times, and/or a statistically significant number of times.

One example of a deceleration area is a stop. As used herein, the term "stop" is an area in which a moving vehicle comes to a stop. The stop may occur based on traffic regulating devices, laws, rules, regulations, ordinances, and/or prevailing conditions. Thus, a stop can be known in advance, or it can occur in real-time. A "learned stop" is an area in which a vehicle has exhibited a similar deceleration pattern to come to a stop in substantially the same area. More particularly, a "learned stop" can be an area in which a vehicle has exhibited a similar deceleration pattern to come to a stop in substantially the same area for at least a threshold number of times, a minimum number of times, and/or a statistically significant number of times. The terms "stop" and "deceleration area" can be used interchangeably for purposes of this description. Thus, if a portion of this description is directed to a deceleration area, then it will be understood that the description can apply equally to a stop, and vice versa.

A "link" includes a portion of a vehicle travel path between two consecutive deceleration areas. As an example, the "link" can be the segment of a travel path between two intersections. The term "consecutive deceleration areas" means two deceleration areas with no other deceleration area between them. A link can be linear, or it can be non-linear. A "proceeding link" is the link that is immediately after a deceleration area. A "preceding link" is the link on a travel path immediately prior to a deceleration area.

The term "coasting coach support" means any guidance, assistance, advice, suggestions, and/or recommendations, in any form, relating to decelerating a vehicle, now known or later developed. More particularly, "coasting coach support" can include any guidance, assistance, advice, suggestions, and/or recommendations relating to decelerating a vehicle at least from a fuel economy standpoint. For example, the "coasting coach support" can include advice on when the driver should remove his or her foot from the accelerator pedal to allow the vehicle to coast and/or when to engage the brake pedal and an appropriate level, amount, or degree of braking.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example a vehicle 100 is shown. As used herein, "vehicle" means any form of motorized transport. In one or more implementations, the vehicle 100 can be an automobile. While arrangements will be described herein with respect to automobiles, it will be understood that embodiments are not limited to automobiles. In some instances, the vehicle 100 can be a conventional vehicle. In other instances, the vehicle 100 can be a hybrid vehicle, such as a plug-in hybrid vehicle.

The vehicle 100 can include various elements. Some of the possible elements of the vehicle 100 are shown in FIG. 1 and will now be described. It will be understood that it is not necessary for the vehicle 100 to have all of the elements shown in FIG. 1 or described herein. The vehicle 100 can have any combination of the various elements shown in FIG. 1. Further, the vehicle 100 can have additional elements to those shown in FIG. 1. In some arrangements, the vehicle 100 may not include one or more of the elements shown in FIG. 1. Further, while the various elements are shown as being located within the vehicle 100 in FIG. 1, it will be understood that one or more of these elements can be located external to the vehicle 100. Further, the elements shown may be physically separated by large distances.

The various elements can be communicatively linked through one or more communication networks. As used herein, the term "communicatively linked" can include direct or indirect connections through a communication channel or pathway or another component or system. A "communication network" means one or more components designed to transmit and/or receive information from one source to another. One or more of the elements of the vehicle 100 can include and/or execute suitable communication software, which enables the various elements to communicate with each other through the communication network and perform the functions disclosed herein.

The one or more communication networks can be implemented as, or include, without limitation, a wide area network (WAN), a local area network (LAN), the Public Switched Telephone Network (PSTN), a wireless network, a mobile network, a Virtual Private Network (VPN), the Internet, and/or one or more intranets. The communication network further can be implemented as or include one or more wireless networks, whether short range (e.g., a local wireless network built using a Bluetooth or one of the IEEE 802 wireless communication protocols, e.g., 802.11a/b/g/i, 802.15, 802.16, 802.20, Wi-Fi Protected Access (WPA), or WPA2) or long range (e.g., a mobile, cellular, and or satellite-based wireless network, GSM, TDMA, CDMA, WCDMA networks or the like). The communication network can include wired communication links and/or wireless communication links. The communication network can include any combination of the above networks and/or other types of networks.

The vehicle 100 can include one or more processors 110. "Processor" means any component or group of components that are configured to execute any of the processes described herein or any form of instructions to carry out such processes or cause such processes to be performed. The processor(s) 110 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 110 can include at least one hardware circuit (e.g., an integrated circuit) configured to carry out instructions contained in program code. In arrangements in which there is a plurality of processors 110, such processors can work independently from each other or one or more processors can work in combination with each other. In one or more arrangements, the processor(s) 110 can be a main processor of the vehicle 100.

The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360 degree ground views. The map data 116 can include measurements, dimensions, distances, and/or information for one or more items included in the map data 116 and/or relative to other items included in the map data 116. The map data 116 can include a digital map with information about road geometry. In one or more arrangement, the map data 116 can information about the ground, terrain, roads, surfaces, and/or other features of one or more geographic areas. The map data can include elevation data in the one or more geographic areas. The map data can define one or more ground surfaces, which can include paved roads, unpaved roads, land, and other things that define a ground surface. The map data 116 can be high quality and/or highly detailed.

In one or more arrangements, the one or more data stores 115 can include traffic rules data 117. The traffic rules data 117 can include one or more traffic rules. As used herein, "traffic rule" is any law, rule, ordinance or authority that governs the operation of a motor vehicle, including instances, situations, and/or scenarios in which a motor vehicle is required to stop or reduce speed. The traffic rules data 117 can include speed limit data. The traffic rules data 117 can be international, federal, national, state, city, township and/or local laws, rules, ordinances and/or authorities.

In one or more arrangements, the one or more data stores 115 can include one or more vehicle deceleration records 118. The vehicle deceleration record 118 can include data acquired by the sensor system 120 and/or the navigation system 150 of the vehicle 100. The vehicle deceleration record(s) 118 can include learned and/or unlearned deceleration areas, learned and/or unlearned stops, deceleration profiles, brake pedal data, location data, distance data, temporal data, and any data associated with the deceleration or stopping of the vehicle 100. The vehicle deceleration record(s) 118 can include information associated with a stop or a deceleration area, including a reset distance and/or a start point for providing coasting coach support. The term "start point" or "start point for coasting coach support" means a point, a distance, or an area located before a deceleration area at which coasting coach support begins to be provided. In instances in which a deceleration area is learned, the start point can be a distance from the deceleration area. The start point can be determined in any suitable manner, such as by using the vehicle deceleration record(s) 118. In instances in which a deceleration area has not been learned, a start point can be assigned to the deceleration area until the deceleration area becomes learned. In such case, the start point can be determined in any suitable manner. For instance, the start point can be a predetermined distance from the deceleration area.

In one or more arrangements, the one or more data stores 115 can include deceleration area link data 119. The deceleration area link data 119 can include data about links associated with one or more deceleration areas. The deceleration area link data 119 can be pre-stored on the one or more data stores 115. Alternatively or in addition, the deceleration area link data 119 can be updated and/or generated as the vehicle encounters a deceleration area.

As noted above, the vehicle 100 can include the sensor system 120. The sensor system 120 can include one or more sensors. "Sensor" means any device, component and/or system that can detect, determine, assess, monitor, measure, quantify and/or sense something. The one or more sensors can detect, determine, assess, monitor, measure, quantify and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or other element of the vehicle 100 (including any of the elements shown in FIG. 1).

The sensor system 120 can include any suitable type of sensor. For instance, the sensor system 120 can include one or more vehicle sensors 121, which can be configured to acquire, detect, determine, assess, monitor, measure, quantify and/or sense information about the vehicle 100 itself (e.g., position, location, orientation, speed, acceleration, deceleration, accelerator pedal position, brake pedal position, etc.). Alternatively or in addition, the sensor system 120 can include one or more environment sensors 122, which can be configured to acquire, detect, determine, assess, monitor, measure, quantify and/or sense data or information about the external environment in which a vehicle is located or one or more portions thereof. For example, such data or information can be related to obstacles in at least a portion of the external environment of the vehicle 100 and/or other things in the external environment of the vehicle 100, such as, for example, lane markers, signs, traffic lights, traffic signs, lane lines, crosswalks, curbs proximate the vehicle 100, off-road objects, etc. In one or more arrangements, the sensor system 120 can include one or more radar sensors, one or more LIDAR sensors, one or more sonar sensors, one or more cameras, and/or one or more ranging sensors The vehicle 100 can include an input system 130. An "input system" includes any device, component, system, element or arrangement or groups thereof that enable information/data to be entered into a machine. The input system 130 can be configured to receive an input from a vehicle occupant (e.g. a driver or a passenger). The vehicle 100 can include an output system 135. An "output system" includes any device, component, system, element or arrangement or groups thereof that enable information/data to be presented to a vehicle occupant (e.g. a person, a vehicle occupant, etc.). The output system 135 can be configured to present information/data to a vehicle occupant. Some components of the vehicle 100 may serve as both a component of the input system 130 and a component of the output system 135. The input system 130 and/or the output system 135 can include one or more displays, one or more projectors, and/or one or more speakers, just to name a few possibilities.

The vehicle 100 can include one or more vehicle systems 140. Examples of the one or more vehicle systems 140 include a propulsion system, a braking system, a steering system, a throttle system, a transmission system, a signaling system, and/or a navigation system. Each of these systems can include one or more mechanisms, devices, elements, components, systems, and/or combination thereof, now known or later developed. However, the vehicle 100 can include more, fewer, and/or different vehicle systems. It should be appreciated that although particular vehicle systems are separately defined, each or any of the systems or portions thereof may be otherwise combined or segregated via hardware and/or software within the vehicle 100.

The vehicle 100 can include a navigation system 150. The navigation system 150 can include one or more mechanisms, devices, elements, components, systems, applications and/or combinations thereof, now known or later developed, configured to determine the geographic location of the vehicle 100 and/or to determine a travel route for the vehicle 100.

The navigation system 150 can include one or more mapping applications to determine a travel route for the vehicle 100. For instance, a driver or passenger may input an origin and a destination. The mapping application can determine one or more suitable travel routes between the origin and the destination. A travel route may be selected based on one or more parameters (e.g. shortest travel distance, shortest amount of travel time, etc.). In some arrangements, the navigation system 150 can be configured to update the travel route dynamically while the vehicle 100 is in operation.

The navigation system 150 can include a global positioning system, a local positioning system or a geolocation system. The navigation system 150 can be implemented with any one of a number of satellite positioning systems, such as the United States Global Positioning System (GPS), the Russian Glonass system, the European Galileo system, the Chinese Beidou system, or any system that uses satellites from a combination of satellite systems, or any satellite system developed in the future, including the planned Chinese COMPASS system and the Indian Regional Navigational Satellite System. Further, the navigation system 150 can use Transmission Control Protocol (TCP) and/or a Geographic information system (GIS) and location services.

The navigation system 150 may include a transceiver configured to estimate a position of the vehicle 100 with respect to the Earth. For example, navigation system 150 can include a GPS transceiver to determine the vehicle's latitude, longitude and/or altitude. The navigation system 150 can use other systems (e.g. laser-based localization systems, inertial-aided GPS, and/or camera-based localization) to determine the location of the vehicle 100.

Alternatively or in addition, the navigation system 150 can be based on access point geolocation services, such as using the W3C Geolocation Application Programming Interface (API). With such a system, the location of the vehicle 100 can be determined through the consulting of location information servers, including, for example, Internet protocol (IP) address, Wi-Fi and Bluetooth Media Access Control (MAC) address, radio-frequency identification (RFID), Wi-Fi connection location, or device GPS and Global System for Mobile Communications (GSM)/code division multiple access (CDMA) cell IDs. Thus, it will be understood that the specific manner in which the geographic position of the vehicle 100 is determined will depend on the manner of operation of the particular location tracking system used.

The vehicle 100 can include one or more actuators to modify, adjust and/or alter one or more of the vehicle systems 140 or components thereof to responsive to receiving signals or other inputs from the processor(s) 110 and/or other element of the vehicle 100. The one or more actuators can include motors, pneumatic actuators, hydraulic pistons, relays, solenoids, and/or piezoelectric actuators, just to name a few possibilities.

The vehicle 100 can include one or more modules, at least some of which will be described herein. The modules can be implemented as computer readable program code that, when executed by a processor, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more coasting coach modules 160. The coasting coach module(s) 160 can be configured to perform various functions, particularly functions relating to the deceleration of a vehicle. Examples of such functions are described in U.S. Pat. Nos. 8,862,342 and 9,202,378, both of which are incorporated herein by reference. Some functions of the coasting coach module(s) 160 will be described herein.

The coasting coach module(s) 160 can be configured to generate a deceleration pattern from a current vehicle location to a target stop position or a target decelerated position/speed. The coasting coach module(s) 160 can assist vehicle deceleration on the basis of the deceleration pattern, thereby reducing fuel consumption.

The coasting coach module(s) 160 can be configured to provide coasting coach support when approaching a learned deceleration area, including learned stops. Coasting coach support can be provided in one or more forms. In one or more arrangements, the coasting coach support can be provided in a visual manner. For instance, the coasting coach support can be provided on one or more of the displays located within the vehicle 100. As another example, the coasting coach support can be provided on a display surface within the vehicle 100 using one or more projector(s). In one or more arrangements, the coasting coach support can be provided in an audial manner. For instance, the coasting coach support can be provided on one or more speakers of the vehicle. The coasting coach module(s) 160 can be configured to instruct a driver of the optimal time to release the accelerator pedal, engage the brake pedal, and/or the amount of braking. If a deceleration area or stop is not a learned deceleration area or a learned stop, the coasting coach module(s) 160 can be configured so that coasting coach support is not provided.

The coasting coach module(s) 160 can be configured to present a coasting coach indicator within the vehicle for the learned deceleration area and/or to cause the coasting coach indicator to be presented. The coasting coach indicator can make a vehicle driver aware that coasting coach support is activated, available and/or being provided for an upcoming deceleration area/stop. The coaching support indicator can be provided in any suitable form, now known or later developed.

The vehicle 100 can include one or more deceleration learning modules 170. The deceleration learning module(s) 170 can be configured to perform various functions. Some functions of the deceleration learning module(s) 170 will be described herein.

The deceleration learning module(s) 170 can be configured to receive and/or acquire vehicle deceleration data. Vehicle deceleration data can be any data relating to a deceleration of the vehicle 100, such data can include speed, acceleration/deceleration, pedal position, location, driving environment, etc. The deceleration learning module(s) 170 can receive and/or acquire data from the navigation system 150, the sensor system 120, the data store(s) 115, and/or any other source of information relating to the deceleration of the vehicle 100 at a deceleration area and/or the external environment of the vehicle 100 at or near a deceleration area.

The deceleration learning module(s) 170 can be configured to learn deceleration areas encountered by the vehicle 100. For instance, after the vehicle 100 decelerates in the same or substantially the same area for a predetermined minimum number of times, a threshold number of times, and/or a statistically significant number of times, and/or with similar deceleration patterns, the coasting coach module(s) 160 can be configured to learn that the area is a deceleration area. The predetermined minimum number of times, the threshold number of times, and/or the statistically significant number of times can be established by a vehicle manufacturer or some other entity. The deceleration learning module(s) 170 can be configured to learn the vehicle's deceleration profiles in such deceleration areas.

When a deceleration area is encountered by the vehicle 100, a deceleration record can be created and/or saved by the vehicle 100. The deceleration record can include any vehicle deceleration data, which can be acquired by one or more sensors of the sensor system 120 and/or the navigation system 150.

Figures 2, 3:
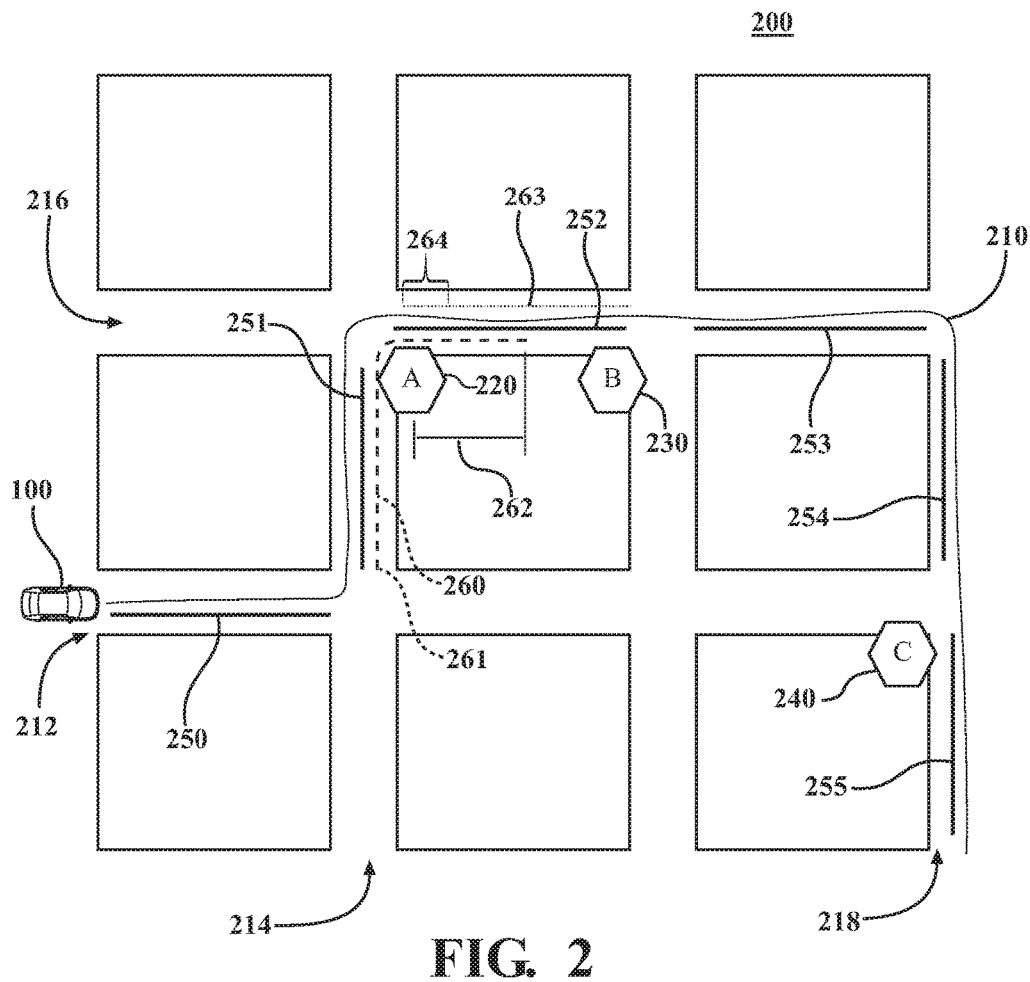
FIG. 2 is a view of an example of a driving scenario in which the vehicle has a travel path that includes a plurality of deceleration areas.
FIG. 3 is an example of a data table of links for the plurality of deceleration areas encountered by a vehicle along the travel path of FIG. 2.

However, certain situations may not be conducive to learning a deceleration area. An example of such a driving environment 200 is shown in FIG. 2. The vehicle 100 has a travel path 210 that includes driving on a first road 212, turning left onto a second road 214, and coming to deceleration area A (stop 220). The travel path further includes a right turn onto a third road 216 and coming to deceleration area B (stop 230). The travel path includes continuing on the third road 216, making a right turn onto a fourth road 218, and coming to deceleration area C (stop 240). For the travel path 210 shown in FIG. 2, there can be a first link 250, a second link 251, a third link 252, a fourth link 253, a fifth link 254, and a sixth link 255.

Deceleration area A (stop 220) can be a learned deceleration area. Deceleration area A can have a coasting coach support area 260 in which coasting coach support for deceleration area A is provided. The coasting coach support area 260 can have a start point 261 for coasting coach support. The coasting coach support area 260 for the deceleration area A can include a reset distance 262. The term "reset distance" means a distance after a learned deceleration area or learned stop in which coaching support continues to be provided for the deceleration area or stop. In one or more arrangements, the reset distance 262 can be a predetermined distance. In one or more arrangements, the reset distance 262 can be a distance associated with a predetermined period of time. Deceleration areas can have an associated reset distance for various reasons. For instance, the coasting coach module(s) 160 may need time to clear the coasting coach support for one deceleration area and initiate the coasting coach support for the subsequent deceleration area. Alternatively or in addition, there may be variations as to where the vehicle 100 actually stops or reaches a certain reduced speed with respect to a deceleration area. The reset distance 262 can provide a margin for such variations.

Deceleration area B (stop 230) can have a coasting coach support area 263. The coasting coach support area 263 can have a start point 264 for coasting coach support. In this example, the start point 264 can be an area defined by a distance along the coasting coach support area 263. The coasting coach support area 263 can include a reset distance (not shown) following deceleration area B (stop 230).

The vehicle 100 can be configured to identify links for the deceleration areas. FIG. 3 is an example of a data table 300 of links for the plurality of deceleration areas encountered by the vehicle 100 along the travel path 210. The deceleration areas can have one or more preceding links and a proceeding link. The link data can be predetermined, or it can be determined in real-time. While the data table 300 reflects two preceding links, only the preceding link immediately prior to the deceleration area may be needed for purposes of arrangements described herein. Thus, in some arrangements, there may only be one preceding link for the deceleration areas.

In this example, the preceding links for deceleration area A include the first link 250 and the second link 251. The proceeding link for deceleration area A includes the third link 252. The preceding links for deceleration area B include the second link 251 and the third link 252. The proceeding link for deceleration area B includes the fourth link 253. The preceding links for deceleration area C include the fourth link 253 and the fifth link 254. The proceeding link for deceleration area C includes the sixth link 256.

The deceleration learning module(s) 170 can be configured to selectively save deceleration records for each deceleration area encountered by the vehicle 100. The vehicle 100 can acquire vehicle deceleration data for the deceleration area using one or more sensors of the sensor system 120 and/or the navigation system 150. The acquired vehicle deceleration record 118 can be stored in the one or more data store(s) 115, thereby creating/saving a deceleration record for the deceleration area. The acquired vehicle deceleration data can be used for any suitable purposes in the future. By acquiring and storing the vehicle deceleration record 118, the second deceleration area may eventually become a learned deceleration area for the vehicle 100.

However, there may be some instances in which it is not desirable to create/save a deceleration record for the deceleration area. In such cases, the deceleration learning module(s) 170 can be configured to selectively disable learning of the deceleration area. The determination of whether to selectively disable learning can be based on one or more factors. For instance, the learning can be selectively disabled if a deceleration area has already been learned by the vehicle 100.

As another example, the learning of a deceleration area can be selectively disabled based on at least in part the deceleration area link data 119 for two consecutive deceleration areas, including a first deceleration area and a second deceleration area. In such case, the deceleration learning module(s) 170 can be configured to determine whether the proceeding link for the first deceleration area matches the preceding link for the second deceleration area. For a portion of the travel path 210 shown in FIG. 2, deceleration area A and deceleration area B can be consecutive deceleration areas. The proceeding link for deceleration area A can be compared to the preceding link for deceleration area B, as is shown at 302 in FIG. 3. The proceeding link for deceleration area A is the third link 252, and the preceding link for deceleration area B is the third link 252. The links are identical; therefore, the links match. In such case, deceleration area B is a candidate for disabling learning, as will be explained further below.

For another portion of the travel path 210 shown in FIG. 2, deceleration area B and deceleration area C can be consecutive deceleration areas. The proceeding link for deceleration area B can be compared to the preceding link for deceleration area C, as is shown at 304 in FIG. 3. The proceeding link for deceleration area B is the fourth link 253, and the preceding link for deceleration area C is the fifth link 254. The links are not identical; therefore, they do not match. In such case, learning for deceleration area C would remain enabled.

Alternatively or in addition, the learning of a deceleration area can be selectively disabled based on at least in part when two consecutive deceleration areas are located "in close proximity." In such case, learning can be disabled for the second of the two consecutive deceleration areas. Whether two consecutive deceleration areas are located "in close proximity" to each other can be determined in one or more ways. In one or more arrangements, "in close proximity" can mean that a first deceleration area and a second deceleration area are located within a predetermined distance of each other. In one or more arrangements, "in close proximity" means that the distance between the first deceleration area and the second deceleration area is less than the reset distance of a first learned deceleration area. In one or more arrangements, "in close proximity" means that a start point for coasting coach support for a second deceleration area overlaps the reset distance of a first deceleration area. The term "the start point for coasting coach support for a second deceleration area overlaps the reset distance of a first deceleration area" and variants thereof means the location of the start point for coasting coach support for the second deceleration area is at least partially located within any portion of the reset distance for the first deceleration area. The term "in close proximity" can include any combination of the ways described above and/or elsewhere in this description. In the example shown in FIG. 2, the start point 264 for deceleration area B (stop 230) overlaps the reset distance 262 of the deceleration area A. Thus, deceleration area A and deceleration area B would be considered to be in close proximity.

If the first deceleration area and the second deceleration area are located in close proximity to each other, there may not be enough time for the coasting coach module(s) 160 to provide coasting coach support for the second deceleration area. If the distance between the first deceleration area and the second deceleration area is greater than the reset distance of a first learned deceleration area, then the first deceleration area and the second deceleration area are not located in close proximity to each other. Alternatively or in addition, if the start point for coasting coach support for a second deceleration area does not overlap the reset distance of a first deceleration area, then the first deceleration area and the second deceleration area are not located in close proximity to each other. Such determination can be made by the deceleration learning module(s) 170 and/or the processor(s) 110.

In one or more arrangements, if it is determined both (a) that the proceeding link for the first deceleration area matches the preceding link for the second deceleration area and (b) that the first deceleration area and the second deceleration area are located in close proximity to each other, the learning of the second deceleration area can be automatically disabled. As a result, a deceleration record/vehicle deceleration data for the second deceleration area is not saved. However, if it is determined that at least one of (a) that the proceeding link for the first deceleration area does not match the preceding link for the second deceleration area or (b) that the first deceleration area and the second deceleration area are not located in close proximity to each other, vehicle deceleration data for the second deceleration area can be acquired using one or more sensors of the sensor system 120 and/or the navigation system 150. A deceleration record for the second deceleration area can be created and/or saved. In such case, by acquiring and storing the vehicle deceleration record 118, the second deceleration area may eventually become a learned deceleration area for the vehicle 100.

Figure 4:
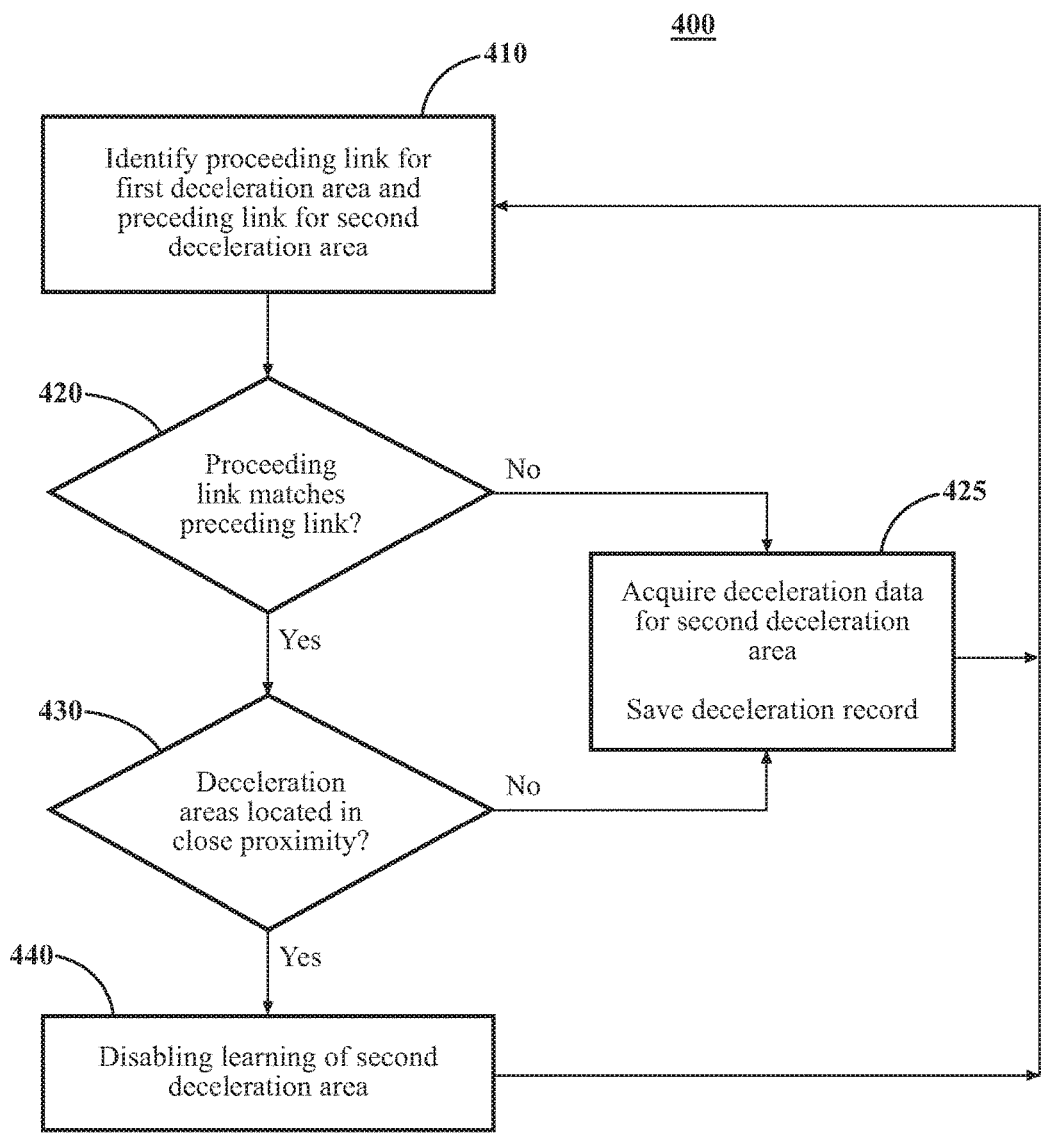
FIG. 4 is an example of a method of disabling the learning of a second deceleration area by a vehicle.

Now that the various potential systems, devices, elements and/or components of the vehicle 100 have been described, various methods of operating the vehicle will now be described. Referring now to FIG. 4, an example of a method 400 is shown. Various possible steps of such methods will now be described. The method 400 illustrated in FIG. 4 may be applicable to the arrangements described above in relation to FIGS. 1-3, but it is understood that the method 400 can be carried out with other suitable systems and arrangements. Moreover, the method 400 may include other steps that are not shown here, and in fact, the method 400 is not limited to including every step shown. The blocks that are illustrated here as part of the method 400 are not limited to the particular chronological order. Indeed, some of the blocks may be performed in a different order than what is shown and/or at least some of the blocks shown can occur simultaneously.

At block 410, the proceeding link for a first deceleration area can be identified, and a preceding link for the second deceleration area can be identified. The second deceleration area is subsequent to the first deceleration area in the travel direction of the vehicle. The proceeding link and/or the preceding link can be identified at any suitable time. For instance, the proceeding link and/or the preceding link can be identified when a travel route is determined or at any time thereafter. In one or more arrangements, the proceeding link and/or the preceding link can be identified in real-time. In one or more arrangements, the proceeding link and/or the preceding link can be identified after the vehicle has decelerated for the previous deceleration area. In one or more arrangements, when the vehicle enters the first deceleration area, the vehicle 100 can look ahead to identify the next deceleration area and determine the proceeding link and/or the preceding link. In one or more arrangements, the proceeding link and/or the preceding link can be identified at substantially the same time, or they can be identified at different times.

The identifying can be performed in any suitable manner, such as by querying the data store(s) 115 for deceleration area link data 119. The identifying of the proceeding link and/or the preceding link can be performed by any suitable element or combination of elements of the vehicle 100. In one or more arrangements, the identifying of the proceeding link and/or the preceding link can be performed, at least in part, by the navigation system 150, the deceleration learning module(s) 170, the coasting coach module(s) 160, and/or the processor(s) 110. The method can continue to decision block 420.

At decision block 420, it can be determined whether the proceeding link for the first deceleration area matches the preceding link for the second deceleration area. The determining can be performed by any suitable element or combination of elements of the vehicle 100. In one or more arrangements, the determining of whether the consecutive stops are learned stops can be performed, at least in part, by the navigation system 150, the deceleration learning module(s) 170, the coasting coach module(s) 160, and/or the processor(s) 110.

If the proceeding link for the first deceleration area does not match the preceding link for the second deceleration area, then the method 400 can end, return to block 410, or continue to some other block. For instance, in one or more arrangements, the method can continue to block 425. At block 425, vehicle deceleration data for the second deceleration area can be acquired using one or more sensors of the sensor system 120. The acquired vehicle deceleration record 118 can be stored in the one or more data store(s) 115, thereby creating/saving a deceleration record for the second deceleration area. The acquired vehicle deceleration data can be used for any suitable purposes in the future. By acquiring and storing the vehicle deceleration record 118, the second deceleration area may eventually become a learned deceleration area for the vehicle 100. The vehicle deceleration record 118 can be analyzed by the deceleration learning module(s) 170, the coasting coach module(s) 160, and/or the processor(s) 110. After block 425, the method 400 can end, return to block 410, or continue to some other block If the proceeding link for the first deceleration area matches the preceding link for the second deceleration area, then the method can continue to decision block 430. At decision block 430, it can be determined whether the first deceleration area and the second deceleration area are located in close proximity to each other. The determination of whether the first deceleration area and the second deceleration area are located in close proximity to each other can be performed in any suitable manner. For instance, the location of the start point for coasting coach support for the second deceleration area can be compared to the reset distance of the first deceleration area. The start point and/or the reset distance can be obtained from any suitable source, such as the data store(s) 115, the deceleration learning module(s) 170, and/or the coasting coach module(s) 160.

The comparison of the start point for coasting coach support for the second deceleration area and the reset distance can be performed at any suitable time. For instance, the comparison can be performed as the vehicle approaches the first deceleration area, while stopped at the first deceleration area, after stopping/decelerations with respect to the first deceleration area, as the vehicle approaches the second deceleration area, and/or before the vehicle 100 commences travel, just to name a few possibilities.

If the start point for coasting coach support for the second deceleration area does not overlap the reset distance of first deceleration area, then it can be determined that the first deceleration area and the second deceleration area are not located in close proximity to each other. In such case, the method 400 can end, return to block 410, or continue to some other block. For instance, in one or more arrangements, the method can continue to block 425. After block 425, the method 400 can end, return to block 410, or continue to some other block.

If the start point for coasting coach support for the second deceleration area overlaps the reset distance of first deceleration area, then it can be determined that the first deceleration area and the second deceleration area are located in close proximity to each other. In such case, the method 400 can continue to block 440. At block 440, the learning of the second deceleration area can be disabled. As a result, a deceleration record for the second deceleration area is not saved. In some instances, the disabling of the learning for the second deceleration area can include disabling the acquiring of vehicle deceleration data for the second deceleration area. Alternatively, if learning for the second deceleration area is disabled, vehicle deceleration data for the second deceleration area deceleration can be acquired using one or more sensors of the sensor system 120, but a deceleration record for the second deceleration area, based on and/or including the vehicle deceleration data, is not created and/or saved. After block 440, the method 400 can end, return to block 410, or continue to some other block.

It should be noted that the disabling of the learning applies only to the second deceleration area. If there is another deceleration area after the second deceleration area, then the method 400 can be performed again. There may or may not be learning of the deceleration area after the second deceleration area. Also, it should be noted that in at least some implementations, the arrangements described herein may only apply when the first deceleration area is a learned deceleration area and the second deceleration area is not a learned deceleration area. In some instances, once a deceleration area becomes learned, then deceleration records are no longer created and/or saved for that deceleration area.

It will be appreciated that arrangements described herein can provide numerous benefits, including one or more of the benefits mentioned herein. For example, arrangements described herein can disable unnecessary learning of a deceleration area when coasting coach support cannot be provided for the deceleration area. By disabling the learning, a driver will not build an expectation that support for the deceleration will eventually be provided. Thus, arrangements described herein can improve vehicle-driver interaction and expectations.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A method for a vehicle, the vehicle being configured to learn deceleration areas, the method comprising:

identifying, using one or more processors located onboard the vehicle, a proceeding link for a first deceleration area and a preceding link for a second deceleration area, the first deceleration area and the second deceleration area being consecutive deceleration areas;

determining, using the one or more processors, whether the proceeding link for the first deceleration area matches the preceding link for the second deceleration area;

determining, using the one or more processors, whether the first deceleration area and the second deceleration area are located in close proximity to each other;

responsive to determining both that the proceeding link for the first deceleration area matches the preceding link for the second deceleration area and that the first deceleration area and the second deceleration area are located in close proximity to each other, disabling learning of the second deceleration area, whereby a deceleration record for the second deceleration area is not saved; and responsive to determining that the proceeding link for the first deceleration area does not match the preceding link for the second deceleration area or that the first deceleration area and the second deceleration area are not located in close proximity to each other, acquiring, using one or more sensors located onboard the vehicle, deceleration data of the vehicle for the second deceleration area and generating, using the one or more processors, a deceleration record for the second deceleration area using the acquired deceleration data for the second deceleration area, whereby the deceleration record for the second deceleration area is saved, the deceleration data including at least one of: vehicle speed, vehicle deceleration, brake pedal position, or accelerator pedal position, the one or more sensors being operatively connected to the one or more processors, the one or more sensors being configured to acquire deceleration data about the vehicle.

2. The method of claim 1, wherein at least one of the first deceleration area and the second deceleration area is a stop.

3. The method of claim 1, wherein determining whether the first deceleration area and the second deceleration area are located in close proximity to each other includes:
   determining a reset distance for the first deceleration area;
   determining a start point for coasting coach support for the second deceleration area;
   determining whether the start point for coasting coach support for the second deceleration area overlaps the reset distance of the first deceleration area; and
   responsive to determining that the start point for coasting coach support for the second deceleration area overlaps the reset distance of the first deceleration area, determining that the first deceleration area and the second deceleration area are located in close proximity to each other.

4. The method of claim 3, further including:
   responsive to determining that the start point for coasting coach support for the second deceleration area does not overlap the reset distance of the first deceleration area, determining that the first deceleration area and the second deceleration area are not located in close proximity to each other.

5. The method of claim 3, wherein the reset distance is a predetermined distance after the first deceleration area along a travel path of the vehicle.

6. The method of claim 1, wherein the first deceleration area is a learned deceleration area.

7. A system for a vehicle, the vehicle being configured to learn deceleration areas, the system comprising:
   one or more sensors configured to acquire deceleration data of the vehicle, the deceleration data including at least one of: vehicle speed, vehicle deceleration, brake pedal position, or accelerator pedal position, the one or more sensors being located onboard the vehicle;
   one or more processors located onboard the vehicle, the one or more sensors being operatively connected to the one or more processors, the one or more processors being configured to create a deceleration records, using deceleration data acquired by the one or more sensors, for deceleration areas encountered by the vehicle, the one or more processors being programmed to initiate executable operations comprising:
      identify a proceeding link for a first deceleration area and a preceding link for a second deceleration area, the first deceleration area and the second deceleration area being consecutive deceleration areas;
      determine whether the proceeding link for the first deceleration area matches the preceding link for the second deceleration area;
      determine whether the first deceleration area and the second deceleration area are located in close proximity to each other;
      responsive to determining both that the proceeding link for the first deceleration area matches the preceding link for the second deceleration area and that the first deceleration area and the second deceleration area are located in close proximity to each other, disabling learning of the second deceleration area, whereby a deceleration record for the second deceleration area is not saved; and
      responsive to determining that the proceeding link for the first deceleration area does not match the preceding link for the second deceleration area or that the first deceleration area and the second deceleration area are not located in close proximity to each other, acquiring, using the one or more sensors, deceleration data of the vehicle for the second deceleration area and generating an deceleration record for the second deceleration area using the acquired deceleration data for the second deceleration area, whereby the deceleration record for the second deceleration area is saved.

8. The system of claim 7, wherein at least one of the first deceleration area and the second deceleration area is a stop.

9. The system of claim 7, wherein determining whether the first deceleration area and the second deceleration area are located in close proximity to each other includes:
   determining a reset distance for the first deceleration area;
   determining a start point for coasting coach support for the second deceleration area;
   determining whether the start point for coasting coach support for the second deceleration area overlaps the reset distance of the first deceleration area; and
   responsive to determining that the start point for coasting coach support for the second deceleration area overlaps the reset distance of the first deceleration area, determining that the first deceleration area and the second deceleration area are located in close proximity to each other.

10. The system of claim 9, further including:
    responsive to determining that the start point for coasting coach support for the second deceleration area does not overlap the reset distance of the first deceleration area, determining that the first deceleration area and the second deceleration area are not located in close proximity to each other.

11. The system of claim 9, wherein the reset distance is a predetermined distance after the first deceleration area along a travel path of the vehicle.

12. The system of claim 7, wherein the first deceleration area is a learned deceleration area.

13. A computer program product for a vehicle, the vehicle including one or more processors and one or more sensors located onboard the vehicle, one or more sensors being configured to acquire deceleration data, the one or more sensors being operatively connected to the one or more processors, the one or more processors being configured to create a deceleration records, using deceleration data acquired by the one or more sensors, for deceleration areas encountered by the vehicle, the vehicle being configured to learn deceleration areas, the computer program product comprising a non-transitory computer readable storage medium having program code embodied therein, the program code executable by a processor to perform a method comprising:
   identifying a proceeding link for a first deceleration area and a preceding link for a second deceleration area, the first deceleration area and the second deceleration area being consecutive deceleration areas;
   determining whether the proceeding link for the first deceleration area matches the preceding link for the second deceleration area;
   determining whether the first deceleration area and the second deceleration area are located in close proximity to each other;
   responsive to determining both that the proceeding link for the first deceleration area matches the preceding link for the second deceleration area and that the first deceleration area and the second deceleration area are located in close proximity to each other, disabling learning of the second deceleration area, whereby a deceleration record for the second deceleration area is not saved; and responsive to determining that the proceeding link for the first deceleration area does not match the preceding link for the second deceleration area or that the first deceleration area and the second deceleration area are not located in close proximity to each other, acquiring, using the one or more sensors, deceleration data of the vehicle for the second deceleration area and generating an deceleration record for the second deceleration area using the acquired vehicle deceleration data for the second deceleration area, whereby a deceleration record for the second deceleration area is saved, the deceleration data including at least one of: vehicle speed, vehicle deceleration, brake pedal position, or accelerator pedal position.

14. The computer program product of claim 13, wherein at least one of the first deceleration area and the second deceleration area is a stop.

15. The computer program product of claim 13, wherein determining whether the first deceleration area and the second deceleration area are located in close proximity to each other includes:

determining a reset distance for the first deceleration area;

determining a start point for coasting coach support for the second deceleration area;

determining whether the start point for coasting coach support for the second deceleration area overlaps the reset distance of the first deceleration area;

responsive to determining that the start point for coasting coach support for the second deceleration area overlaps the reset distance of the first deceleration area, determining that the first deceleration area and the second deceleration area are located in close proximity to each other; and responsive to determining that the start point for coasting coach support for the second deceleration area does not overlap the reset distance of the first deceleration area, determining that the first deceleration area and the second deceleration area are not located in close proximity to each other.

16. The computer program product of claim 15, wherein the reset distance is a predetermined distance after the first deceleration area along a travel path of the vehicle.

* * * * *